United States Patent [19]
Dage

[11] Patent Number: 6,087,650
[45] Date of Patent: Jul. 11, 2000

[54] SOLAR SENSOR FOR MEASURING LOW ANGLE SOLAR HEATING OF VEHICLE OCCUPANTS

[75] Inventor: Gerhard Allan Dage, Franklin, Mich.

[73] Assignee: Ford Motor Company, Dearborn, Mich.

[21] Appl. No.: 09/072,072

[22] Filed: May 4, 1998

[51] Int. Cl.$^7$ ............................... F28F 1/00; H01J 40/14
[52] U.S. Cl. ........................ 250/214 AL; 236/DIG. 15; 165/41
[58] Field of Search .................. 250/214 AL, 203.4, 250/206.1, 206.2, 208.2, 208.6, 214 R; 236/DIG. 15, 91 C; 165/41, 42, 43, 202, 203, 204; 454/75

[56] References Cited

U.S. PATENT DOCUMENTS

| | | | |
|---|---|---|---|
| 4,890,460 | 1/1990 | Takasi et al. | 62/180 |
| 5,117,744 | 6/1992 | Zimmer et al. | |
| 5,181,654 | 1/1993 | Yoshimi et al. | |
| 5,555,136 | 9/1996 | Waldmann et al. | 359/871 |
| 5,670,774 | 9/1997 | Hill . | |

OTHER PUBLICATIONS

"Solar Sensors For Automotive Climate Control Systems, Solar Sensors—Dual Zone, Uniform, & 50% Overhead Response", ©1990 GTE Products Corporation, Control Device Operation, 13 pp.

*Primary Examiner*—John R. Lee
*Assistant Examiner*—Glen T Kinnear
*Attorney, Agent, or Firm*—Raymond L. Coppiellie

[57] ABSTRACT

A solar sensor for a vehicle that is incorporated as part of the vehicle climate control system is disclosed. The solar sensor include a photo diode assembly including a sensing surface. The photo diode assembly is mounted on a horizontally extending portion of a dashboard of a vehicle with the sensing surface oriented substantially parallel to the plane that an occupant's body lies within when seated in the vehicle. The sensing surface is preferably oriented within a range of between about 16° and 40° above horizontal toward the front of a vehicle. Optimally, the sensing surface is oriented at an angle of 28° above horizontal relative to the front of the vehicle. The photo diode assembly includes a housing having a base surface mounted to the dashboard that is configured to hold the sensing surface of the photo diode in the desired angular orientation. The solar sensor is preferably concealed by a portion of the dashboard between the instrument panel and the windshield so that it is concealed from the line of sight of the front seat occupants.

11 Claims, 3 Drawing Sheets

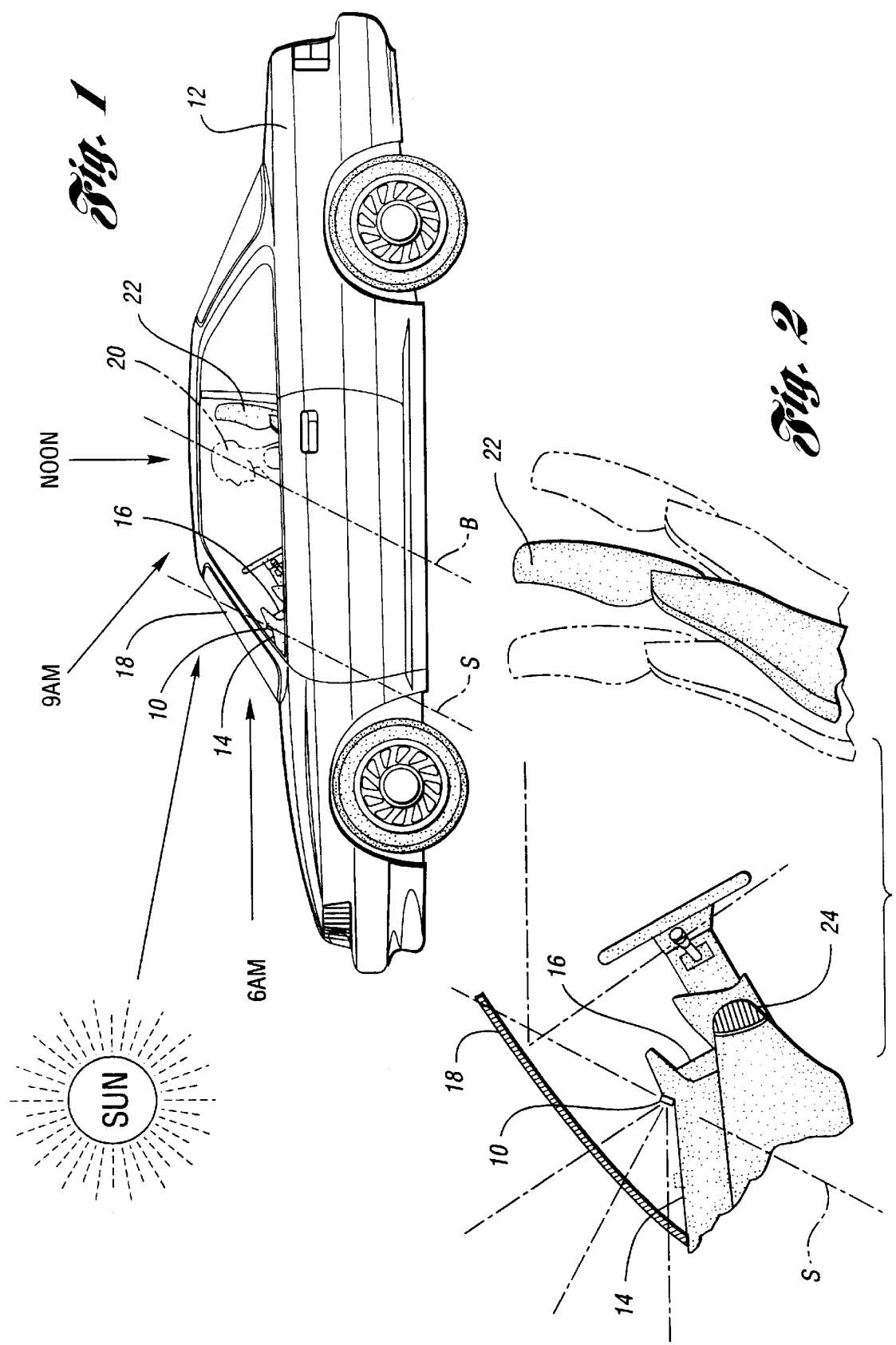

SOLAR SENSOR FOR MEASURING LOW ANGLE SOLAR HEATING OF VEHICLE OCCUPANTS

TECHNICAL FIELD

The present invention relates to a sunshine sensor for a vehicle.

BACKGROUND OF THE INVENTION

Solar, or sunshine, sensors are used in vehicle ventilation systems to compensate for sunshine irradiated into a car onto occupants of the vehicle. Advanced ventilation systems currently provided for cars can be provided with a thermostat that can be set at a predetermined temperature, such as 72° F. While the interior of the car can be controlled to maintain the predetermined temperature through heating or air conditioning, comfort is not assured unless there is a mechanism to compensate for the apparent increase in temperature caused by sunlight being directed upon the occupants when the sun is at a low azimuth angle. The vehicles ventilation system may be set to maintain a temperature of, for example, 68° to 72° F. However, with direct sunlight entering the vehicle at 9:00 in the morning when the vehicle is heating east, the occupant may be uncomfortable at that range of temperature unless the ventilation system can compensate for the sunlight by controlling the interior of the car to a cooler temperature by several degrees. The solar, or sunshine, sensor is used to provide information to the ventilation system control as to the direction and angle of sunlight entering the vehicle.

Various prior art approaches to this problem have produced complex and costly systems for providing this temperature compensation. For example, in U.S. Pat. No. 5,181,654, a system is disclosed wherein three diodes are provided on three differently angularly oriented surfaces whereby sunshine components including elevation angle, azimuth and heat reception quantity are measured. It was an object of that system to measure the elevation angle, azimuth angle of the sunshine and quantity of heat received by the car. These measurements are computed by matching the sum vector of the normal vectors of three light receiving elements. This is a complex and expensive system.

Another proposed solution to this problem is disclosed in an article entitled, *Solar Sensors-Dual Zone, Uniform, and Fifty Percent Overhead Response.* The solar sensor in this article includes a photo diode that is covered by a diffuser and a dark lens cover that absorbs light striking the diffuser when the sun is overhead by 50 percent of its maximum value. This solar sensor is relatively expensive and can provide inaccurate compensation if the sun is directed from the rear or side of the vehicle onto the sensor.

The above problems are addressed by the present invention in a cost-effective manner as summarized below.

SUMMARY OF THE INVENTION

According to the present invention, a solar sensor is provided on a vehicle dashboard that extends in a generally horizontal orientation. The solar sensor is incorporated as part of the vehicle climate control system and comprises a photo diode assembly including a planar sensing surface. The photo diode assembly is mounted on the horizontally oriented portion of the dashboard with the sensing surface oriented substantially parallel to the plane that an occupant's upper body lies within when seated in the vehicle. Depending upon vehicle design parameters and manufacturing constraints the sensing surface of the solar sensor is preferably oriented in an angle of approximately 28° above horizontal toward the front of the vehicle. The sensing surface may be oriented within a range of between about 16° and 40° above horizontal toward the front of the vehicle.

According to another aspect of the invention, a solar sensor is provided for a vehicle that has an instrument panel and a windshield with a dashboard including a portion extending from a top portion of the instrument panel to a lower portion of the windshield. The solar sensor comprises a photo diode lying in a plane that is mounted on a housing. The housing has a base surface and a photo diode supporting surface. The base surface is secured to the dashboard and is configured to hold the photo diode in a plane that is substantially parallel to the midpoint of the normal range of angular adjustment of a front vehicle seat.

The base surface may be angularly oriented relative to a surface upon which the photo diode is attached so that the angular orientation of the portion of the dashboard where the base is secured is compensated for by the configuration of the housing.

The solar sensor may be concealed by a portion of the dashboard between the instrument panel and the windshield from the line of sight of a driver operating the vehicle.

According to another aspect of the present invention, a vehicle is provided having a windshield, an instrument panel and a dash board extending between the instrument panel and the windshield. A heating and air conditioning system is provided with a solar sensor for compensating for the solar heating of the occupants to the vehicle. A solar sensor is secured to the dashboard of the vehicle and includes a housing. A photo diode is secured to the housing. The photo diode has a receptor face oriented to be perpendicular to the median of the sun's rays entering the passenger compartment through the windshield of the vehicle that impinge directly upon the body of an occupant seated in the front seat of the vehicle.

These and other aspects and advantages of the present invention will be better understood by the attached drawings and following detailed description of the invention.

DETAILED DESCRIPTION OF THE DRAWINGS

FIG. 1 is a side elevational view a vehicle including the solar sensor of the present invention.

FIG. 2 is a fragmentary diagrammatic view showing the orientation of the solar sensor relative to the windshield, and a vehicle seat in a range of adjustment positions.

DETAILED DESCRIPTION OF THE PREFERRED EMBODIMENT

Figure 3:
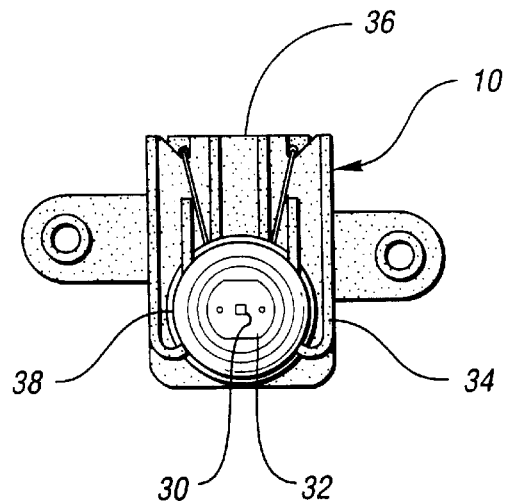
FIG. 3 is a plan view of a solar sensor that can be used according to the present invention.

Referring now to FIGS. 1 and 2, a solar sensor 10 for a vehicle 12 is mounted on a horizontally extending dashboard 14 of the vehicle. The dashboard 14 extends between the instrument panel 16 and the windshield 18 of the vehicle 12. An occupant 20 as shown in phantom in FIG. 1 seated on the front seat 22 of the vehicle 12. References to the vehicle seat 22 shall be understood to refer primarily to the vehicle seat back. The vehicle 12 is provided with an advanced climate control system 24, or heating and air conditioning system.

Referring now to FIG. 3, a preferred solar sensor 10 is illustrated as a photo diode 30. The photo diode 30 includes a receptor face 32, or sensing surface, that is supporting on a housing 34. Housing 34 includes a base surface 36 and a photo diode supporting surface 38. The base surface 36 and photo diode surface 38 are angularly oriented relative to each other to hold the photo diode supporting surface in a plane S that is substantially parallel to a plane B that is the plane in which the occupant's upper body is maintained when the occupant 20 is seated in the vehicle seat 22.

Generally, peak sun loading occurs when the sun angle is normal to the angle to an occupant's upper torso. This is a function of the vehicle seat and windshield arrangement and with some current car designs has been found to be about 28° above horizontal relative to the front of the vehicle. This is the optimum positioning of the solar sensor, however, vehicle design parameters and manufacturing tolerances can be accommodated according to the present invention by positioning the receptor face 32 within a range of between about 16° and 40° above horizontal toward the front of the vehicle.

The angular orientation of the vehicle seat 22 is normally adjustable relative to a mid-point of 118° relative to horizontal in the forward direction. The solar sensor mounted according to the present invention should lie in a plane between 100° and 140° relative to the horizontal in the forward direction.

The housing of the solar sensor 10 should be configured so that the angular orientation of the base surface 36 relative to the receptor face 32 compensates for the angular orientation of the dashboard 14 so that the receptor face 32 is held in the proper orientation. It should be understood that the dashboard 14 may not be horizontal but may be contoured depending upon the vehicle design.

The solar sensor 10 is preferably mounted on a contoured portion of the dashboard 14 so that it is substantially concealed by the dashboard 14. In this way, the solar sensor 10 will not distract the driver or detract from the appearance of the dashboard 14. Stated in another way, the solar sensor is preferably concealed by a portion of the dashboard between the instrument panel and the windshield from the line of sight of a driver operating the vehicle.

The range of optimum receptor face orientations is defined by orienting the receptor face so that at least 50 percent of the sensor output is obtained when the angle of solar radiation entering the vehicle through the windshield and impinging upon occupants is at its peak.

Figure 4:
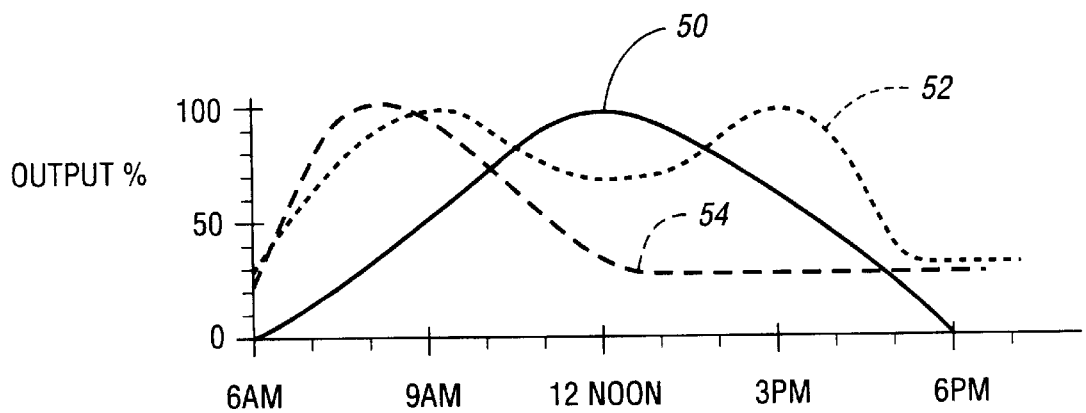
FIG. 4 is a graph showing a characteristic of the relationships between the output ratio of a sun load sensor according to the time of day for two current sensor designs and a sensor made in accordance with the present invention.

Referring now to FIG. 4, the solar sensor of the present invention is shown in comparison to two known prior art solar sensor arrangements. The solid line 50 in FIG. 4 shows the sensor output for a current production sensor that is mounted horizontally on the dashboard with the receptor face oriented at 90° above horizontal relative to the front of the vehicle. The maximum output of the sensor occurs at noon when the sun is directly overhead. With this arrangement, the sensor tends to overcorrect due to high intensity at noon. In this arrangement, the sensor undercorrects during mid-morning or afternoon when the sun is at a low azimuth angle due to the fact that the solar radiation is directed directly toward the front seat occupant's chest or body. This results in under-correction by the sensor due to the direct sunlight on the body.

The dashed line 52 is the sensor output plot for the prior art sensor with diffuser and lens cover referred to in the background art section above. This solar section provides maximum output at 9:00 a.m. and also at 3:00 p.m. without changing the direction of the vehicle. While the output at noon is minimized, it is undesirable that the correction from sun entering the rear or side of the vehicle will cause overcorrection since the sun is not directed to the face and upper body of the occupant when it is entering through the rear of the vehicle.

The dashed line 54 shows the output of the sensor when mounted to be oriented with the receptor face 32 oriented at its optimum 28° above horizontal orientation. With the sensor mounted parallel to the plane of the front seat occupants it eliminates the need for a custom filter and provides optimum sensor performance as will be described below in reference to FIG. 5.

Figure 5:
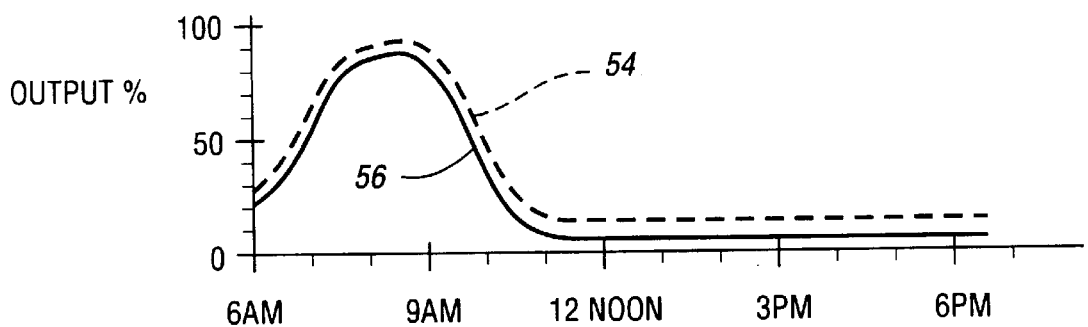
FIG. 5 is a graph showing sensor output by time of day for the sensor of the present invention and a solar load as felt by an occupant.

Referring now to FIG. 5, the dashed line 54 shows the solar load as measured by the sensor in its optimum position with the line 56 showing the solar load as felt by the occupant of the front seat of the vehicle. It will be appreciated that this orientation provides optimum output of the sensor that closely parallels the solar load as felt by the occupant. This way the vehicle's climate control system 24 can best compensate for the solar load felt by the occupant.

Figure 6:
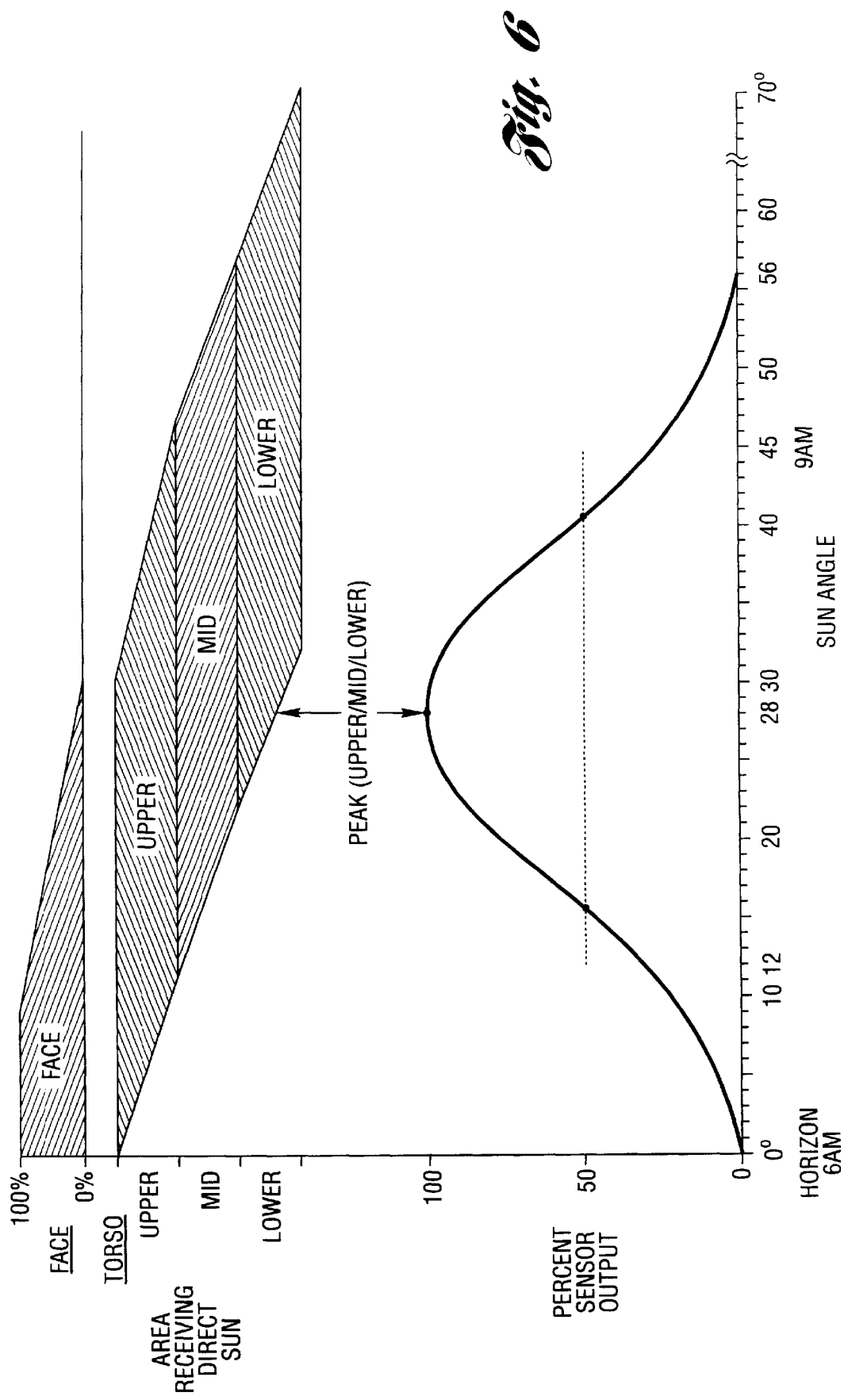
FIG. 6 is a graph showing sensor output by time of day with a chart showing the area of impingement upon a front seat occupant's body requiring solar load compensation.

Referring now to FIG. 6, a chart of the solar sensor output relative to sun angle is shown in conjunction with a diagram showing the area on an occupant receiving solar radiation through the windshield of the vehicle. In a preferred range of orientations, the solar sensor is arranged with its receptor face 32 oriented so that at least 50 percent of the sensor output is realized when the sun angle is between 16° and 40° above horizontal. The peak output valve in certain vehicles has been determined to be at a nominal 28° above horizontal. This angle is derived from the upper body angle and the windshield opening dimensions and is subject to change in various vehicle configurations.

The above description of the preferred embodiment of the present invention is intended to provide an example and is not to be read in a limiting sense. The broad scope of the present invention should be construed by the references following the claims.

What is claimed is:

1. A solar sensor for a vehicle having a dashboard including a generally horizontally extending portion, the solar sensor being incorporated as part of a vehicle climate control system, the solar sensor comprising:

a photo diode assembly including a sensing surface;

said photo diode assembly being mounted on the horizontally extending portion of the dashboard with the sensing surface oriented substantially parallel to the plane that an occupant's upper body lies in when seated in the vehicle.

2. The solar sensor of claim 1 wherein a line normal to the sensing surface is oriented within a range of between about 16 and 40 degrees above horizontal toward the front of the vehicle.

3. The solar sensor of claim 1 wherein a line normal to the sensing surface is oriented at an angle of 28 degrees above horizontal toward the front of the vehicle.

4. A solar sensor for a vehicle having an instrument panel and windshield with a dashboard including a portion extending from a top portion of the instrument panel to a lower portion of the windshield, the solar sensor comprising:

a photo diode lying in a plane; and a housing having a base surface and a photo diode supporting surface, said base surface being secured to the portion of the dashboard extending between the instrument panel and the windshield, the housing being configured to hold the sensing surface the photo diode in a plane that is parallel to the midpoint of the normal range of angular adjustment of a front vehicle seat back.

5. The solar sensor of claim 4 wherein the midpoint of the normal range of angular adjustment of the front vehicle seat back is 118 degrees relative to horizontal in the forward direction.

6. The solar sensor of claim 4 wherein the sensing surface of the photodiode lies in a range that is between 100° and 140° relative to horizontal in the forward direction.

7. The solar sensor of claim 4 wherein the housing is configured with the base surface angularly oriented relative to a surface upon which the photo diode is attached so that the angular orientation of the portion of the dashboard where the base is secured is compensated for by the configuration of the housing.

8. The solar sensor of claim 4 wherein the portion of the dashboard where the base surface to which the sensor is secured is angularly oriented in the plane that is parallel to the midpoint of the normal range of angular adjustment of the front vehicle seat and the base surface and photo diode supporting surface are parallel to each other.

9. The solar sensor of claim 8 wherein the solar sensor is concealed by the portion of the dashboard between the instrument panel and the windshield from the line of sight of a driver operating the vehicle.

10. The solar sensor of claim 4 wherein the solar sensor is not visible by a driver of the vehicle due to the contour of the portion of the dashboard between the instrument panel and the windshield.

11. A vehicle having a windshield, an instrument panel and a dashboard extending between the instrument panel and the windshield, a heating and air conditioning system having a solar sensor for compensating for solar heating of the occupants of the vehicle the solar sensor being secured to the dashboard comprising:

a housing secured to the dashboard;

a photo diode secured to the housing, said photo diode having a receptor face oriented to be substantially perpendicular to the median of the sun rays entering the passenger compartment through the windshield of the vehicle that impinge directly upon an upper portion of a front seat of the vehicle.

* * * * *